(12) United States Patent
Greenberg (10) Patent No.: US 6,349,023 B1
(45) Date of Patent: Feb. 19, 2002

(54) POWER CONTROL SYSTEM FOR ILLUMINATION ARRAY

(75) Inventor: Michael Philip Greenberg, Goffstown, NH (US)

(73) Assignee: Robotic Vision Systems, Inc., Canton, MA (US)

( * ) Notice: Subject to any disclaimer, the term of this patent is extended or adjusted under 35 U.S.C. 154(b) by 0 days.

(21) Appl. No.: 09/512,575

(22) Filed: Feb. 24, 2000

(51) Int. Cl.[7] ................................................ H02H 5/04
(52) U.S. Cl. ..................... 361/103; 361/93.8; 361/78; 361/86; 361/59
(58) Field of Search ................................ 361/103, 106, 361/78, 79, 86–87, 93.8, 59–60; 374/134, 163, 43

(56) References Cited

U.S. PATENT DOCUMENTS

| | | | | |
|---|---|---|---|---|
| 4,001,649 A | * | 1/1977 | Young | 361/106 |
| 4,052,744 A | * | 10/1977 | Boothman et al. | 361/103 |
| 4,727,450 A | * | 2/1988 | Fachinetti et al. | 361/103 |
| 5,073,838 A | * | 12/1991 | Ames | 361/103 |

* cited by examiner

*Primary Examiner*—Michael J. Sherry
(74) *Attorney, Agent, or Firm*—Bourque & Associates, P.A.

(57) ABSTRACT

A power control system, which serves to protect a dissipative/resistive load from exceeding a predetermined temperature limit. The power control system accurately models the temperature of the load and enforces a cooling period to reduce the temperature of the load being protected to a base temperature level if the predetermined temperature limit is reached. Also provided is a method of selectively connecting and disconnecting a resistive load to and from a power source to prevent the resistive load from exceeding a predetermined high temperature limit. The method includes sensing a voltage proportional to the instantaneous power passing through the resistive load by wiring a current sensing resistor in series with the resistive load. Then, a load temperature is modeled using a load temperature modeling circuit to produce an output voltage proportional to a present temperature of the resistive load. A power switch is then selectively controlled to disconnect said power source from the resistive load when a high temperature limit is reached and to re-connect the power source to the resistive load when a base temperature is reached.

17 Claims, 7 Drawing Sheets

POWER CONTROL SYSTEM FOR ILLUMINATION ARRAY

FIELD OF THE INVENTION

The present invention relates to lighting control systems, and in particular, to controls for illumination systems associated with inspection systems. Specifically, the invention provides a power control system that protects a dissipative load, such as an LED illumination array, from reaching life-shortening or destructive temperature levels.

BACKGROUND OF THE INVENTION

Digital data and signal processing techniques and technology have tremendously advanced the ability to use computers as data processing systems to accomplish sophisticated inspection procedures without human intervention. Almost every type of product can benefit from low cost, high precision, high speed inspection technology derived from these new digital data and signal processing techniques.

For example, in computers and other electronic systems, the electrical connections between electronic components ("chips") are critical to the operation of the system. As a result of recent technological advances, electronic components are decreasing in size and increasing in complexity, requiring a larger number of electrical connections to be made in a smaller area. Inspection of the electronic components during a manufacturing process helps assure that electrical contacts are properly formed and prevents failed electrical connections between electronic components.

In order to properly inspect such electronic components, sophisticated illumination systems and methods have been developed. One such illumination system, which is especially suitable for illuminating ball grid arrays (BGAs), which are commonly used in manufacturing electronic components, is disclosed, for example, in commonly-owned U.S. Pat. No. 5,943,124, which is fully incorporated herein by reference. t The '125 teaches the use of a ring-shaped light source, which includes a plurality of light emitting elements, such as light emitting diodes (LEDs). While this light source is designed especially for use in illuminating BGAs for inspection purposes, various configurations of LED arrays may be employed for a wide variety of illumination sources for a wide variety of inspection applications.

However, one drawback of using LED arrays as illumination sources is that LEDs are dissipative (resistive) loads. Accordingly, as an LED array, or any other dissipative/resistive load for that matter, is powered, it will heat up. If the heat build up is allowed to progress, uncontrolled, the temperature of the array may reach a destructive or life-shortening level.

Various systems and methods have been employed in the past to prevent dissipative/resistive loads from exceeding certain pre-defined life-shortening temperature levels. These systems and methods include the use of basic systems and methods of maintaining a temperature that employ convective cooling, e.g. forcing cool air over the array using a fan or the like.

More sophisticated control systems have been employed as well. One such system controls the temperature of an LED array, thus ensuring that the peak and average temperatures of the array fall within safe limits, by enforcing a maximum pulse width of an LED power signal (during which the LED array is powered) and a minimum off time between pulses. This type of control system employs a simple digital circuit that simply generates a delay after each pulse.

A slightly more sophisticated prior art system computes an inter-pulse minimum delay based on the then-current pulse width. An even more sophisticated prior art system even takes the pulse repetition rate into account.

Since all of the prior art control systems are based on theoretical average thermal characteristics, they do not take into account the real-time, actual heat generation of an LED array. Therefore, a margin of safety must be factored into all prior art control systems. These built-in safety margins necessarily reduce the actual time of array illumination, which in turn limits the throughput of the inspection systems with which they are associated.

Accordingly, it would be advantageous, and a significant improvement over the prior art, to provide a power control circuit suitable for use in controlling dissipative/resistive loads, and in particular, LED illumination arrays, that accurately models the heat being generated by the resistive load that it is controlling. In this manner, arbitrary, built-in safety margins could be eliminated. This would provide a significant improvement in inspection system throughput. It would also make it possible to input a complex series of pulses of varying widths and intervals, such that power to the LED array could be arbitrarily switched without restriction, provided the modeled maximum temperature limit was not exceeded.

SUMMARY OF THE INVENTION

The disclosed invention overcomes the drawbacks associated with the prior art control systems by providing a power control system which serves to protect a dissipative/resistive load from exceeding a predetermined temperature limit by accurately modeling the temperature of the load and by enforcing a cooling period to reduce the temperature of the load being protected to a base level if the predetermined temperature limit is reached.

Also provided is a method of selectively connecting and disconnecting a resistive load to and from a power source to prevent the resistive load from exceeding a predetermined high temperature limit. The method begins by registering a voltage proportional to an instantaneous current passing through the resistive load. This is accomplished by wiring a current sensing resistor in series with the resistive load. A load temperature is then modeled using a load temperature analog circuit to produce an output voltage proportional to a current temperature of the resistive load. The output voltage of the analog circuit is then compared to a voltage proportional to a predetermined high temperature limit.

A switch is selectively controlled to disconnect the power source from the resistive load when the high temperature limit is reached and to re-connect the power source to the resistive load when a base temperature is reached.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Turning now to the figures, a simple power control system 10 according to the present invention is shown. The disclosed system will be explained with reference to a control system associated with an illumination array for an inspection system and, in particular, an LED illumination array. However, this is not a limitation of the present invention as the principles of the disclosed control system are equally applicable to any system controlling a dissipative/resistive load, where there is a critical temperature above which the load will experience degradation of performance, a shortened life cycle or ultimately, destruction of the resistive load.

Figure 1:
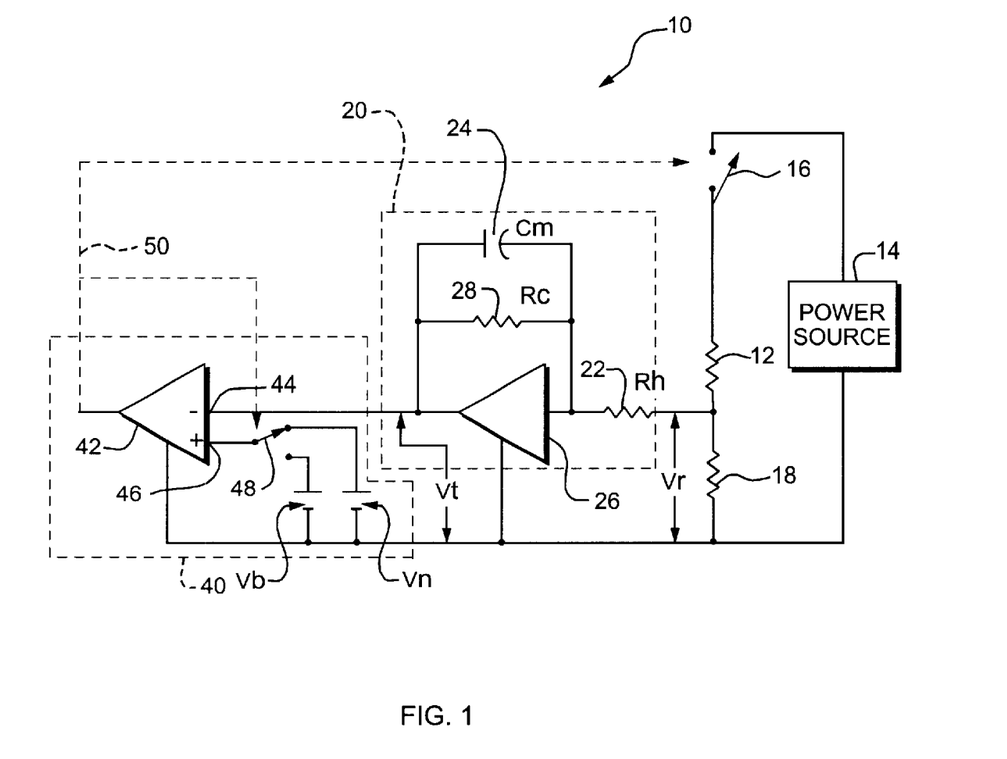
FIG. 1 is an analog power control system embodying the principles of the present invention.

The power control system 10 accurately models the temperature of a resistive type load 12, which, in the exemplary embodiment, is an LED illumination array. The power control system is configured to enforce a cooling period if the modeled temperature reaches a predetermined limit. The cooling period is initiated by disconnecting the load 12 from a continuous power supply, such as constant voltage power source 14, using an electronically controlled power switch 16.

The power control system 10 is made up of a temperature modeling circuit 20 and a modeled temperature comparison circuit 40. In operation, the temperature modeling circuit 20 models the temperature of the resistive/dissipative load 12 and the modeled temperature comparison circuit 40 compares the modeled temperature to one or more temperature setpoints, as will be discussed in greater detail below.

The power control system 10 is based on the principle that heat flow Q can be modeled by electrical power P, temperature T by voltage V, thermal resistance by electrical resistance R and thermal mass by capacitance C. For a linear electrical system, the behavior of voltage over time is represented by the mathematical function for power, given constant capacitance and electrical resistance. Likewise for a linear thermal system, the behavior of temperature over time is represented by a function of heat input, given constant thermal mass and thermal resistance. The only differences are provided by constants of proportionality.

When the load 12 is connected to the voltage source 14, a current sensing resistor 18 is wired in series with the load 12. The current sensing resistor 18 therefore registers a voltage proportional to the instantaneous current in the load. The current sensing resistor 18 is calibrated to the thermal characteristics and operating power level of the load, which normalizes the operation of the system to any load characteristic. In one embodiment of the invention, the current sensing resistor 18 used in the power control circuit 10 can be selected from a plurality of resistors. In an alternative embodiment, the current sensing resistor 18 may be a variable resistor whose resistive value may be varied by a system user to match the thermal characteristics and operating power level of the resistive/dissipative load 12 being controlled.

Since energy is supplied to the load 12 and the current sensing resistor 18 by a constant voltage source 14, the registered resistor voltage Vr will be proportional to the instantaneous power of the load.

The temperature modeling circuit 20 produces an output voltage Vt, which is proportional to the instantaneous current temperature of the resistive load 12, such as an LED illumination array. The temperature modeling circuit 20 models the thermal mass, the heating rate and the cooling rate of the load 12 using the principles mentioned above.

Specifically, the thermal mass of the load is modeled by a capacitor 24, which is provided in the feedback loop of an operational amplifier (op-amp) 26. In one preferred embodiment, the op-amp 26 comprises a high gain operational amplifier, such as a Linear Tech 1013CN8 dual op-amp. The thermal mass modeling capacitor has a value of Cm, chosen to accurately model the particular load 12 that is being controlled by the power control circuit of the present invention.

The heating rate of the load 12 is modeled using a heating rate modeling resistor (Rh) 22 wired in series with the operational amplifier 26. The cooling rate of the load 12 is modeled using a cooling rate modeling resistor (Rc) 28, which is wired in parallel to the thermal mass modeling capacitor 24 in the feedback loop of the operational amplifier 26. The cooling rate is the rate that the load 12 will cool down from the high limit setpoint to a base or ambient temperature when the power supply 14 is disconnected from the resistive load 12.

The operational amplifier output voltage $v_t$ will therefore be equal to the voltage across the thermal mass modeling capacitor 24. Thus, $v_t$ will be representative of the current temperature of the load 12 at any given point in time.

As indicated above, the heating rate of the load is modeled by the heating rate modeling resistor 22, which provides a heating time constant equal to:

$$Rh*Cm. \hspace{2em} \text{(Equation 1)}$$

In much the same manner, the cooling rate of the load is modeled the cooling rate modeling resistor 28, which provides a discharge time constant equal to:

$$Rc*Cm. \hspace{2em} \text{(Equation 2)}$$

The modeled temperature comparison circuit 40 compares the operational amplifier output voltage $v_t$, which represents the temperature of the load, with one of at least one reference temperature setpoint. This is accomplished using a threshold comparator 42. In one embodiment, the threshold comparator is provided by the second operational amplifier included on the Linear Tech 1013CN8 dual op-amp discussed above. A first input 44 of the threshold comparator 42 is wired to the output of the op-amp 26 so that it senses $V_t$. A second threshold comparator input 46 is wired to at least one reference voltage setpoint devices $V_{ref}$.

In the example shown in FIG. 1, the temperature comparison circuit 40 includes two reference voltage setpoint devices. The first is $V_h$, which represents the high temperature limit setpoint. The second is $V_b$, which indicates the base temperature setpoint. As indicated in FIG. 1, the reference voltage setpoint devices may be simple voltage sources selected to correspond substantially to the desired temperature setpoints. Of course, alternative devices, such as variable voltage devices would allow the system to be easily adjustable for controlling differing resistive loads.

In the example shown, since the temperature comparison circuit 40 will compare the output voltage of the temperature modeling circuit ($V_t$) to a high temperature limit and a base temperature setpoint, the temperature comparison circuit 40 also includes a switch 48 to switch the reference voltage source device $V_{ref}$ that will be compared with the output voltage of the temperature modeling circuit ($V_t$).

In operation, the temperature comparison circuit operates as follows. While the resistive load 12 is connected to the voltage supply 14, the output voltage $V_t$ of the temperature modeling circuit will be proportional to the instantaneous temperature of the load 12. This voltage will be compared by the threshold comparitor 42 to the high temperature limit $V_h$. When the op-amp output voltage $V_t$ reaches the high limit setpoint ($V_h$), the comparator output 50 causes switch 16 to open, thereby removing the voltage source 14 from the load 12. Simultaneously, the comparator output 50, causes switch 48 to switch. This disconnects the high temperature limit voltage setpoint device $v_h$ from the second threshold capacitor input 46 and, simultaneously, connects the base temperature limit voltage setpoint device $v_b$ to the second threshold capacitor input 46.

When the voltage source is removed, the temperature of the load decreases. The temperature drop is modeled by equation 2 above and continues until the temperature modeling circuit output voltage $V_t$ reaches a voltage analogous to the base temperature setpoint.

When the base temperature setpoint ($V_b$) has been reached, the comparator 42 switches again, which allows comparator output 50 to close switch 16 and re-connect power supply voltage 14 to load 12. It also switches switch 48, which removes the base temperature setpoint device $V_b$ from the temperature comparison circuit 42 and reconnects the high temperature limit setpoint device $V_h$ to the temperature comparison circuit 40. The cycling of the power switch continues as the temperature of the load increases and decreases.

Figure 2:
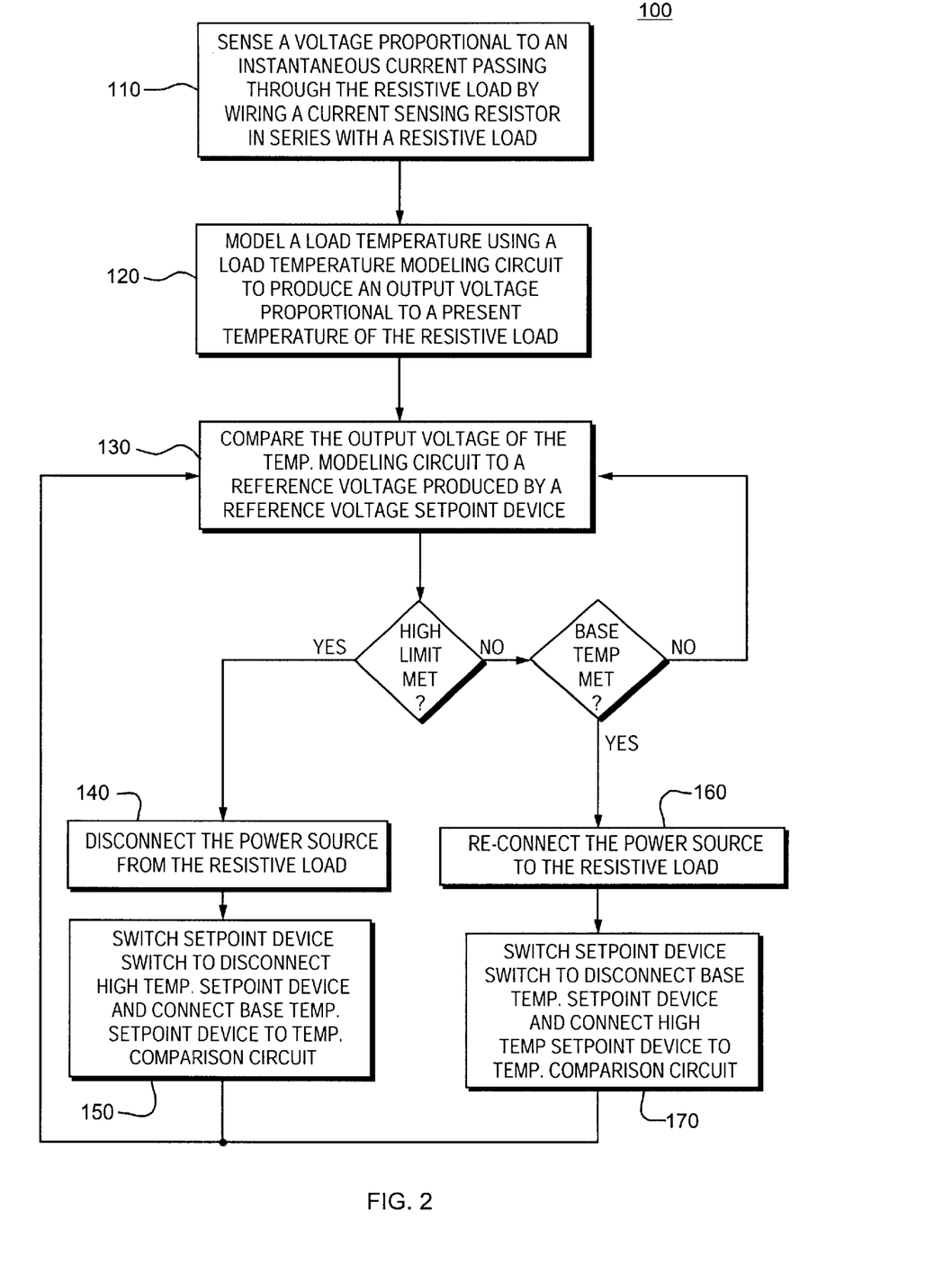
FIG. 2 is a flow chart showing a method of selectively connecting and disconnecting a resistive load to and from a power source to prevent the resistive load from exceeding a predetermined high temperature limit.

FIG. 2 shows a method 100 of selectively connecting and disconnecting a resistive load to and from a power source to prevent the resistive load from exceeding a predetermined high temperature limit. The method begins by sensing a voltage proportional to an instantaneous current passing through the resistive load by wiring a current sensing resistor in series with the resistive load, step 110. Then an instantaneous temperature of the resistive load is modeled using a temperature modeling circuit to produce an output voltage proportional to a present temperature of the resistive load, step 120. The output voltage of the temperature modeling circuit $V_t$ is then compared, using a temperature comparison circuit, to a reference voltage produced by a reference voltage setpoint device, step 130. The reference voltage corresponds to a predetermined temperature limit. In the example of FIG. 1, when the load 12 is connected to the power source 14, the reference voltage setpoint device is a voltage source corresponding to a high temperature limit $V_h$.

When the temperature modeling circuit output voltage $V_t$ is substantially equal to the predetermined high temperature limit, a threshold comparator output 50 switches power switch 16 (FIG. 1), thereby disconnecting the power source 14 from the resistive load, step 140. The threshold comparator output 50 substantially simultaneously switches a reference voltage setpoint device switch 48 (FIG. 1), which removes the reference voltage setpoint device corresponding the high temperature setpoint ($V_h$) from the temperature comparison circuit and connects, in its place, a voltage setpoint device corresponding to a base temperature setpoint ($V_b$) to the temperature comparison circuit, step 150.

Since the power source is disconnected from the resistive load, the resistive load temperature will decrease as indicated above. When the temperature comparison circuit senses that the temperature modeling circuit output voltage ($V_t$) is substantially equal to a voltage corresponding to the base temperature setpoint ($V_b$), the threshold comparator output 50 (FIG. 1) will close switch 16 and re-connect the power source to the resistive load, step 160. At substantially the same time, the threshold comparitor output 50 (FIG. 1) will switch the reference voltage setpoint device switch 48, thereby disconnecting the reference voltage setpoint device associated with the base temperature setpoint ($V_b$) from the temperature comparison circuit and re-connecting the reference voltage setpoint device associated with the high temperature setpoint ($V_h$), step 170.

The step of modeling the load temperature (step 120) utilizes a temperature modeling circuit 20 (FIG. 1), to model a heating rate of the resistive load, the thermal mass of the resistive load, and the cooling rate of the resistive load. The step of modeling the thermal mass of the resistive load includes wiring a capacitor 24 (FIG. 1) in the feedback loop of an operational amplifier 26. The step of modeling a cooling rate of the resistive load includes wiring a resistor 28 in parallel to the capacitor 24 in the feedback loop of the operational amplifier 26. The heating rate of the resistive load is modeled by wiring a resistor 22 in series with the operational amplifier.

Additionally, the method includes varying the resistance of the current sensing resistor 18 to calibrate the load temperature analog circuit to the thermal characteristics and operating power level of the resistive load. Finally, the current sensing resistor, which is wired in series with the resistive load, may be inserted intermediate the resistive load and the power supply so that the power control system can be adapted to a variety of different loads.

Figure 3:
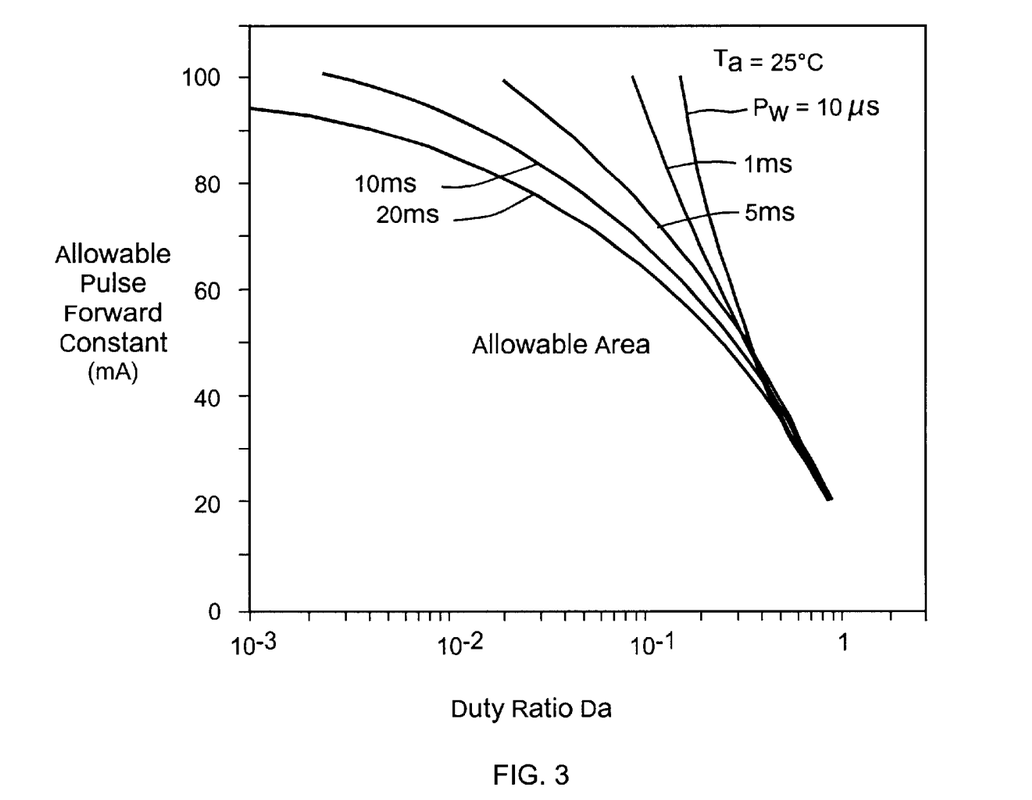
FIG. 3 is a graph of allowable forward current for various fixed pulse widths as a function of duty ratio for a Toshiba MTSP-345 LED array.

The following discussion provides one exemplary embodiment of the invention, which is used to control an LED. FIG. 3 is an LED data sheet for a Toshiba MTSP-345

LED. The data sheet provides an indication of the allowable forward current for various fixed pulse widths as a function of duty ratio. For example, at a duty cycle of 1 (100%), all curves coverage, since this is the LED's DC rating. In this case, the DC rating is 20 milliamperes. Making the simplified assumption that the forward voltage drop is a constant 1.5V, this means that 30 mw of heat are flowing in and out and that the LED is at thermal equilibrium at its maximum safe operating temperature Tmax, which is 125° C. If the ambient temperature is 25° C., then the thermal resistance from the Tmax to ambient can be calculated as follows:

$$R=(Tj-Ta)/P=(125-25/.03)=3333°C./W \quad \text{(Equation 3)}$$

At a pulse width of 10 msec. and a 10% duty cycle, FIG. 3 indicates an allowable forward current of 70 ma. Assuming a constant forward drop of 1.5 v, this corresponds to 105 mw. The average value of this pulse is 7 ma, which provides an average power Pave of 7×1.5=10.5 mw and a peak power Pin of 70×1.5=105 mw. Thus, the total heat input in one pulse is 105 mw×10 msec=1.05 microwatt-second.

Between pulses, the LED cools to Tmin and, in the steady state, the next pulse heats it back up again to Tmax=125° C., according to the curve:

$$T(t)=PinR(1-\epsilon^{-t/RC}) \quad \text{(Equation 4)}$$

Therefore, in 10 milliseconds, the temperature rises from Tmin to Tmax according to the equation:

$$Tmax=Tmin+PinR(1-\epsilon^{-Twidth/RC})$$

$$125° C.=Tmin+(105 \times 10^{-3 \times 3.3 \times 10^3})(1-\epsilon^{-0.01/3300 \times C}) \quad \text{(Equation 5)}$$

Between pulses, the LED cools to Tmin in 90 msec., following the curve:

$$T(t)=Tmax \times \epsilon^{-t/RC}$$

$$Tmin=Tmax \times \epsilon^{-(Tperiod-Twidth)/RC}$$

$$Tmin=125 \times \epsilon^{-090/3300 \times C} \quad \text{(Equation 6)}$$

Since Tmax, Pin, R, Tperiod, and Twidth are all known, equations 5 and 6 can be solved for the two unknowns, thermal mass C and cooled temperature Tmin. The solution involves nonlinear equations but can be solved by numerical methods.

Figure 4:
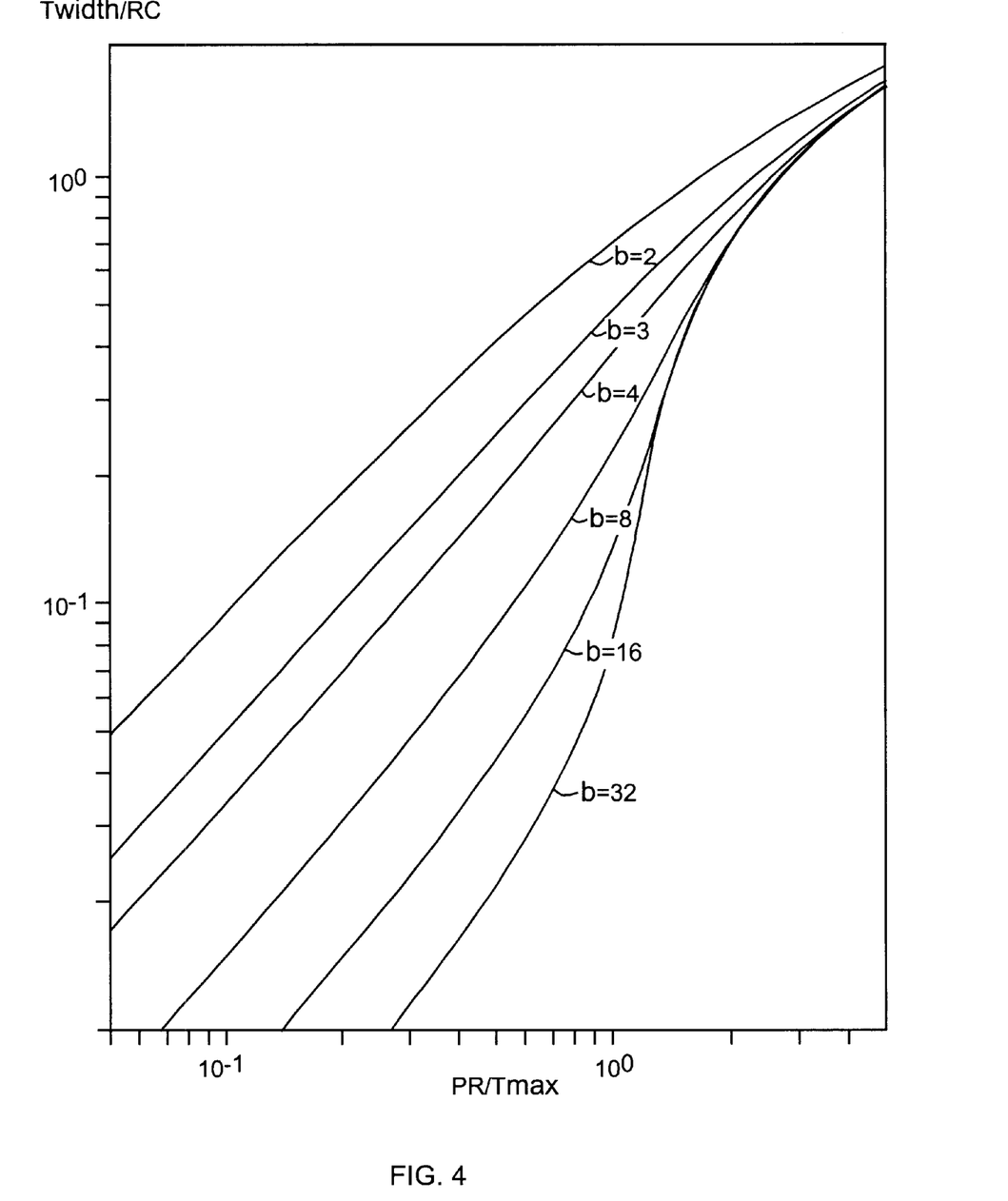
FIG. 4 is a graph of a set of solutions to equations 5 and 6, which are used to calculate the thermal mass of a resistive load according to the present invention.

For example, FIG. 4 can be used to determine the thermal mass C and cooled temperature Tmin. Using the duty cycle b, which is a ratio of Tperiod and Twidth (b=Tperiod/Twidth) to choose one of the curves, a ratio of peak steady-state temperature to peak allowable temperature is used to select a point on the x-axis.

$$(Pin \times R)/Tmax=(\text{peak ss temp.})/(\text{peak allow. temp.})$$

Then, a result is obtained from the y-axis of FIG. 4, which represents Twidth/(R×C). This equation is solved for C and Tmin is determined from Equation 6 above.

In the example of FIGS. 3 and 4, for a 10% duty cycle: b=10, X=(105×10$^{-3}$×3.3×10$^3$)/125=2.77 and y=0.8. Therefore, C=Twidth/(Y×R)=10$^{-3}$/(0.8×3.3×10$^3$) =242×10$^{-6}$watt-sec/° C.

Note that the value of Pin should be adjusted to reflect the light radiated by the LED during each pulse. This is simply a constant (1–η) which can be multiplied by Pin, where η is the radiant efficiency of the LED.

Figure 5:
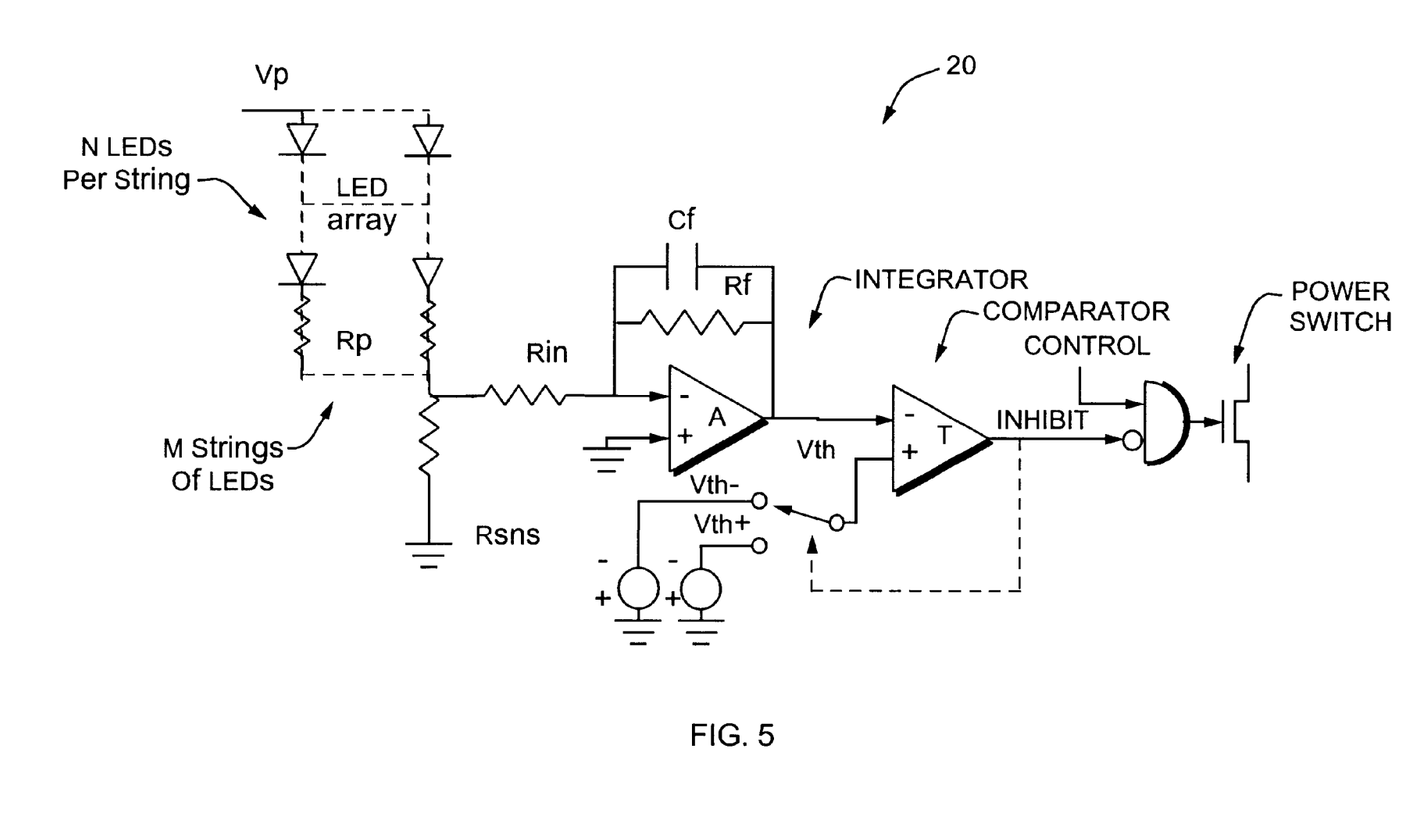
FIG. 5 is one embodiment of a simplified power control system embodying the principles of the present invention.

FIG. 5 is a simplified embodiment of the power control circuit of the present invention, which will be referred to in the following discussion. To determine component values for the temperature modeling circuit 20, a scale factor, which calibrates the current arriving at the operational amplifier A summing node, making it proportional to LED power, must be established. Because the illumination power comes from a constant voltage source $V_p$, and because there is a current limiting resistor Rp in series with each string of LEDs, a constant current flows during each pulse. At the desired current, the forward drop of each LED is $V_f$. This provides a total drop across the LEDs of N=$V_f$ and a pulse current of Ips=(Vp–(N=Vf))/Rs. The pulse current Ips is multiplied by the number of parallel strings of LEDs M. The current sensing resistor value is, therefore, the calculated value for one string of LEDs is divided by the number of parallel strings of LEDs. For example, for a 1 millivolt/milliamp LED, the current sensing resistor value Rsns will be 1 M Ohm.

With a high gain operational amplifier, such as op-amp A, the DC gain of the feedback amplifier is Rf/Rin. This DC gain is set so that the upper comparator threshold voltage Vth– is reached when the maximum steady state current is flowing continuously through each LED. Thus, for a 20 milliampere DC LED maximum rating, a 1 millivolt/milliamp (1 M Ohm) sensing resistor Rsns, and Vth–=–5 volts, the gain must be G=5 volts/20 millivolts=250. Thus, if Rf is arbitrarily chosen to be 1 M ohm, Rin would be 4 K ohms.

The maximum pulse current is set according to application requirements for light intensity, pulse width, and repetition rate. As an example, the maximum pulse current is arbitrarily set at 50 milliamperes. Referring to the vendor's rating chart, FIG. 3., the maximum duty ratio would be 0.3 at 10 milliseconds. This would provide a Tperiod of 33 milliseconds and a ratio of Tperiod/Twidth of 3.33.

One method of establishing a value for Cf is to continuously enable the control input, causing the circuit to oscillate. Cf, and Vth– can then be chosen empirically or calculated directly such that the pulse width and duty cycle conform to the vendor's pulse rating data. They can also be determined directly from FIG. 4, substituting voltage V for scaled temperature T, capacitance Cf for thermal mass C., and resistance Rf for thermal resistance R, all quantities suitably scaled.

For example, using FIG. 4, with b=3, Vth=5 V is substituted for Tmax and the steady integrator amp output voltage of 50 milliamperes/LED input is substituted for peak temperature PR. This provides an X axis entry point of:

$$PR/Tmax=(50 \times 10^{-3} \text{volts} \times 250)/5 \text{ volts}=25.$$

This yields a value for Twidth/RC=1.0 on the Y axis. Thus, Rf=Cf=10 milliseconds, making Cf×10=10$^{-9}$ or 0.01 microfarad.

The lower threshold can then be calculated (substitute for Tmin) by calculating the voltage at the end of the discharge period as follows:

$$Vmin=Vmax \epsilon^{-(Tperiod-Twidth)/RC}=5 \text{ volts} \times \epsilon^{-(23m\ sec)/10m\ sec}=0.1 \text{Volt}$$

Thus, comparator thresholds are set for Vth−=5 volts and Vth+=0.1 volt. Note that since the duty ratio is quite sensitive to Vth+, this should be trimmed empirically in practice.

Comparator T hysteresis thresholds Vth+ and Vth− represent the minimum and maximum LED temperatures Tmin and Tmax., respectively. −Vref, Rs and Rh can thus be calculated given that the output of comparator T swings between voltages Voh (cooling) and Vol (heating), lowering threshold Vth to Vth− when power flow is enabled and raising it to Vth+ when power flow is disabled.

Figure 6:
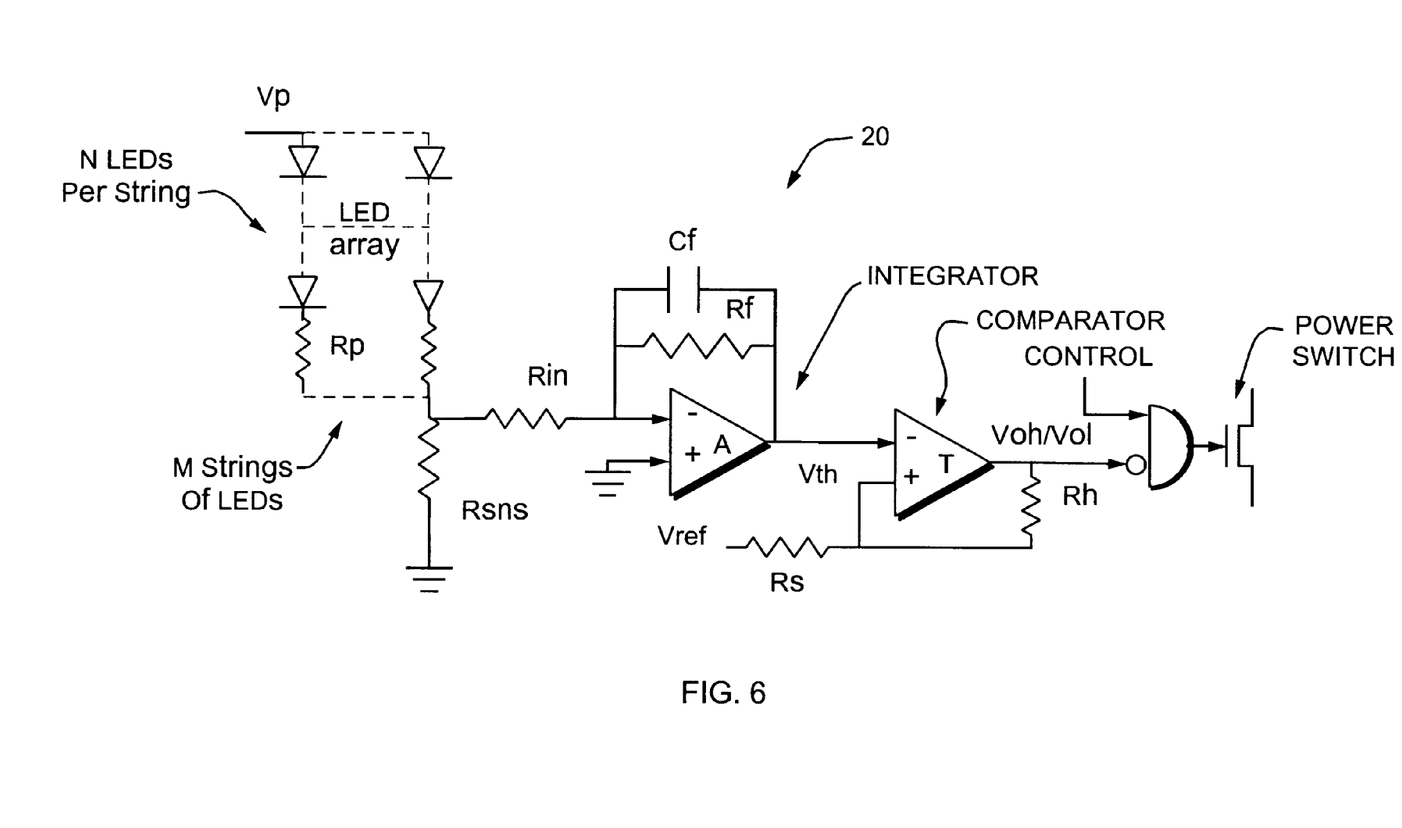
FIG. 6 is another embodiment of a power control system embodying the principles of the present invention.

FIG. 6 shows a more practical comparator circuit where −Vref, Rs, and Rh are calculated such that the output logic voltage swing (Voh to Vol) of comparator T causes the threshold voltage Vth to be Vth− when the comparator output is at Vol (control gate enabled) and Vth+ when it is at Voh (control gate disabled).

Figure 7:
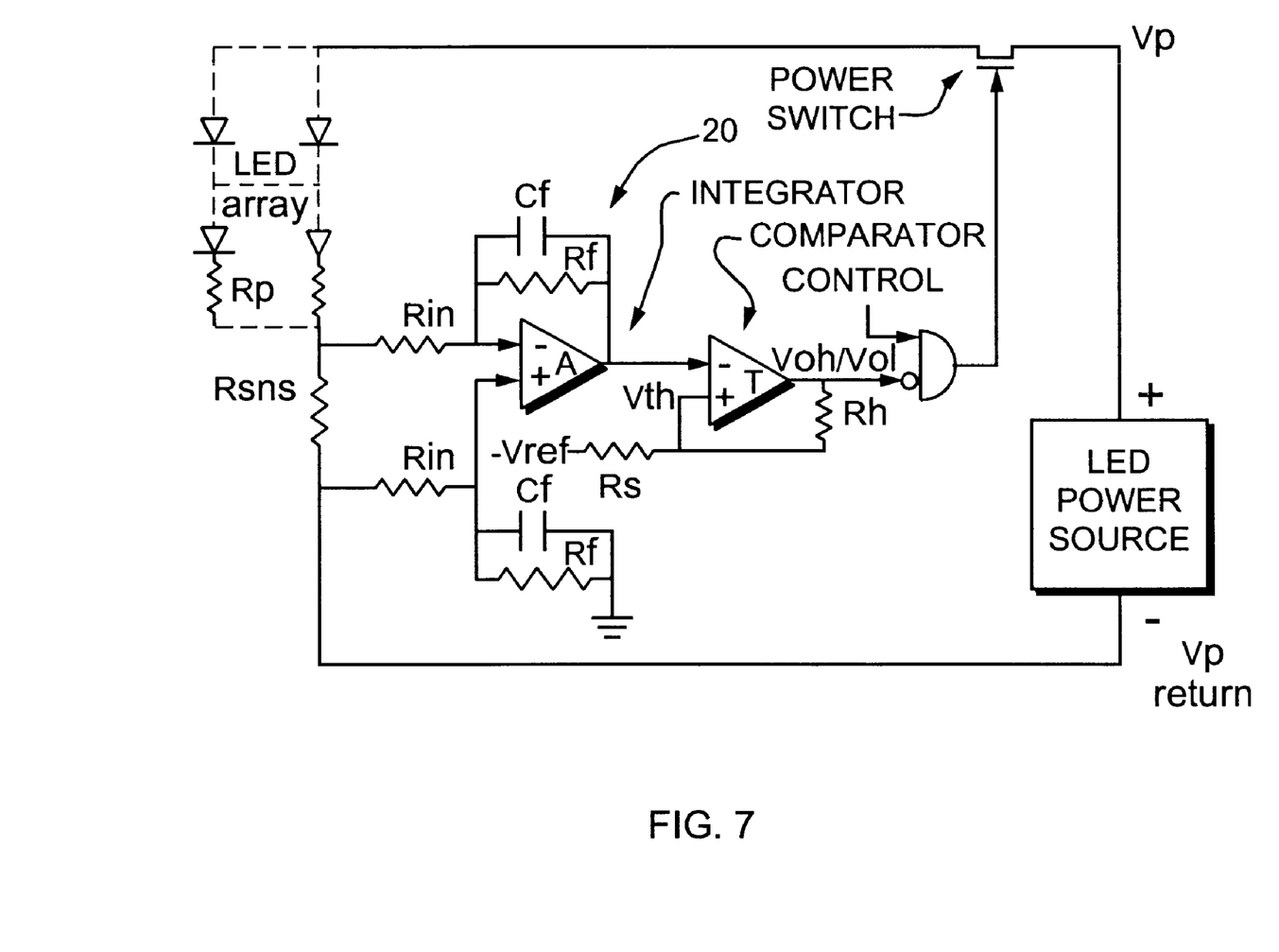
FIG. 7 is another embodiment of a power control system embodying the principles of the present invention.

FIG. 7 shows further improvements which can be made to the operational amplifier circuit to improve common mode rejection and current sensing accuracy by matching the input impedance of the + and− input terminals and by referring the positive input of the integrator op amp A to the negative terminal of the current sensing resistor Rsns in such a way that current returning to the LED power supply does not introduce an additional voltage drop into the current sensing voltage loop.

Accordingly, a system and method of controlling power to a dissipative/resistive load is provided. The system and method serves to protect the dissipative/resistive load from exceeding a predetermined temperature limit by accurately modeling the temperature of the load and by enforcing a cooling period to reduce the temperature of the load being protected to a base or ambient level if the predetermined temperature limit is reached.

Modifications and substitutions by one of ordinary skill in the art are considered to be within the scope of the present invention which is not to be limited except by the claims which follow.

What is claimed is:

1. A power control system for controlling a power switch for selectively connecting and disconnecting a power source to a resistive load to prevent said resistive load from exceeding a predetermined high temperature limit, said power control system comprising:
   a current sensing resistor wired in series with said resistive load for registering a voltage proportional to an instantaneous current passing through said resistive load, said instantaneous current being proportional to instantaneous power in said resistive load;
   a load temperature modeling circuit for producing an output voltage proportional to a present temperature of said resistive load; and
   a temperature comparison circuit for selectively comparing said temperature modeling circuit output voltage to one of a plurality of reference voltage setpoint devices producing voltages proportional to said predetermined high temperature limit and a base temperature, said temperature comparison circuit also for controlling said power switch to disconnect said power source from said resistive load when said high temperature limit is reached and to re-connect said power source to said resistive load when said base temperature is reached and a second switch for selecting one of said reference voltage setpoint devices to connect to said temperature comparison circuit.

2. The power control system as claimed in claim 1, wherein said load temperature modeling circuit comprises a capacitor provided in the feedback loop of an operational amplifier (op-amp) for modeling a thermal mass of said resistive load.

3. The power control system as claimed in claim 2, wherein said load temperature modeling circuit further comprises a resistor wired in series with said op-amp for modeling a heating rate of said resistive load when said resistive load is connected to said power source.

4. The power control system as claimed in claim 3, wherein said load temperature modeling circuit further comprises a resistor wired in parallel to said capacitor in said feedback loop of said op-amp for modeling a cooling rate of said resistive load when said resistive load is disconnected from said power source.

5. The power control system as claimed in claim 4, wherein said temperature comparison circuit comprises a threshold, said threshold comparator having a first input sensing an output voltage of said load temperature modeling circuit op-amp and a second input wired to at least one reference voltage setpoint device.

6. The power control system as claimed in claim 5, wherein said at least one reference voltage setpoint device comprises a high temperature setpoint device and a base temperature setpoint device.

7. The power control system as claimed in claim 5, wherein said at least one reference voltage setpoint device comprises a voltage source selected to correspond substantially to a desired temperature setpoint.

8. The power control system as claimed in claim 7, wherein said at least one voltage source comprises a variable voltage device to allow said at least one reference voltage setpoint device to be adjustable for controlling differing resistive loads.

9. The power control system as claimed in claim 1, wherein said current sensing resistor comprises a variable resistor, which is calibrated to the thermal characteristics and operating power level of said resistive load.

10. The power control system as claimed in claim 9 wherein said current sensing resistor is included as a component that can be inserted intermediate said load and said power supply so that said power control system is adaptable to a variety of different loads.

11. A method of selectively connecting and disconnecting a resistive load to and from a power source to prevent said resistive load from exceeding a predetermined high temperature limit, said method comprising the steps of:
   sensing a voltage proportional to an instantaneous current passing through said resistive load by wiring a current sensing resistor in series with said resistive load;
   modeling a load temperature using a temperature modeling circuit to produce an output voltage proportional to a present temperature of said resistive load;
   comparing said output voltage of said temperature modeling circuit to a reference voltage produced by at least one reference voltage setpoint device, said at least one reference voltage setpoint device corresponding to a predetermined high temperature limit;
   opening a power switch to disconnect said resistive load from said power source when said temperature modeling circuit output voltage is substantially equal to said reference voltage corresponding to said high temperature limit;

substantially simultaneously switching a reference voltage setpoint device switch to remove said reference voltage setpoint device corresponding to said predetermined high temperature limit from said temperature comparison circuit and connecting a voltage setpoint device corresponding to a base temperature setpoint to said temperature comparison circuit;

closing said power switch to re-connect said resistive load to said power source when said temperature modeling circuit output voltage is substantially equal to a reference voltage corresponding to said base temperature setpoint; and substantially simultaneously switching said reference temperature setpoint device switch to disconnect said voltage setpoint device corresponding to said base temperature setpoint and to re-connect said voltage setpoint device corresponding to said high temperature limit to said temperature comparison circuit.

12. The method of selectively connecting and disconnecting a resistive load to and from a power source as claimed in claim 11, wherein said step of modeling a load temperature using a temperature modeling circuit comprises modeling a heating rate of said resistive load, modeling a thermal mass of said load, and modeling a cooling rate of said resistive load.

13. The method of selectively connecting and disconnecting a resistive load to and from a power source as claimed in claim 12, wherein said step of modeling said thermal mass of said resistive load comprises wiring a capacitor in the feedback loop of an operational amplifier (op-amp).

14. The method of selectively controlling connecting and disconnecting a resistive load to and from a power source as claimed in claim 13, wherein said step of modeling a cooling rate of said resistive load comprises wiring a resistor in parallel to said capacitor in said feedback loop of said op-amp.

15. The method of selectively controlling connecting and disconnecting a resistive load to and from a power source as claimed in claim 14, wherein said step of modeling a heating rate of said resistive load comprises wiring a resistor in series with said op-amp.

16. The method of selectively controlling connecting and disconnecting a resistive load to and from a power source as claimed in claim 11, further comprising varying the resistance of said current sensing resistor to calibrate said load temperature modeling circuit to the thermal characteristics and operating power level of said resistive load.

17. The method of selectively controlling connecting and disconnecting a resistive load to and from a power source as claimed in claim 11, wherein said step of wiring a current sensing resistor in series with said resistive load comprises inserting said current sensing resistor intermediate said load and said power supply so that said power control system is adaptable to a variety of different loads.

* * * * *